(12) United States Patent
Henrickson et al.

(10) Patent No.: US 8,667,444 B2
(45) Date of Patent: Mar. 4, 2014

(54) CONCURRENT PLACEMENT AND ROUTING USING HIERARCHICAL CONSTRAINTS

(75) Inventors: Lindor E. Henrickson, San Francisco, CA (US); Lyndon C. Lim, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/399,803

(22) Filed: Feb. 17, 2012

(65) Prior Publication Data

US 2013/0219353 A1 Aug. 22, 2013

(51) Int. Cl.
*G06F 17/50* (2006.01)

(52) U.S. Cl.
CPC ........ *G06F 17/5072* (2013.01); *G06F 17/5077* (2013.01); *G06F 17/5081* (2013.01)
USPC ........... 716/122; 716/123; 716/124; 716/129; 716/130; 716/131; 716/132

(58) Field of Classification Search
CPC ............ G06F 17/5072; G06F 17/5077; G06F 17/5081
USPC .......... 716/122, 123, 124, 129, 130, 131, 132
See application file for complete search history.

(56) References Cited

U.S. PATENT DOCUMENTS

| | | | | |
|---|---|---|---|---|
| 5,465,218 | A * | 11/1995 | Handa | 716/123 |
| 6,145,117 | A * | 11/2000 | Eng | 716/105 |
| 6,385,760 | B2 | 5/2002 | Pileggi et al. | |
| 6,449,761 | B1 * | 9/2002 | Greidinger et al. | 716/122 |
| 6,622,291 | B1 * | 9/2003 | Ginetti | 716/108 |
| 6,651,235 | B2 * | 11/2003 | Dai et al. | 716/55 |
| 6,654,941 | B1 * | 11/2003 | Baumbach | 716/113 |
| 7,500,216 | B1 * | 3/2009 | Blunno et al. | 716/104 |
| 7,587,694 | B1 | 9/2009 | Henrickson et al. | |
| 7,823,116 | B2 * | 10/2010 | Chan | 716/104 |
| 7,865,857 | B1 * | 1/2011 | Chopra et al. | 716/119 |
| 7,904,848 | B2 * | 3/2011 | Coene et al. | 716/126 |
| 7,926,011 | B1 * | 4/2011 | Levitsky et al. | 716/105 |
| 7,996,797 | B1 * | 8/2011 | Singh et al. | 716/103 |
| 8,191,032 | B1 * | 5/2012 | Wadland et al. | 716/136 |
| 8,201,128 | B2 * | 6/2012 | Scheffer | 716/124 |
| 8,296,708 | B1 * | 10/2012 | Chen et al. | 716/122 |
| 8,332,793 | B2 * | 12/2012 | Bose | 716/114 |

(Continued)

OTHER PUBLICATIONS

Erzin, A I, et al "Concurrent Placement and Routing in the Design of Integrated Circuits," Automation and Remote Control, vol. 64, No. 12, 2003, pp. 1988-1999.

(Continued)

*Primary Examiner* — Phallaka Kik
(74) *Attorney, Agent, or Firm* — Blakely, Sokoloff, Taylor & Zafman LLP; Judith A. Szepesi

(57) ABSTRACT

An automated layout method allows designing advanced integrated circuits with design rules of high complexity. In particular, a hierarchical constrained layout process is applicable and useful for analog and mixed-signal integrated circuit designs and may be based on an incremental concurrent placement and routing. Use of constraints from multiple levels of a circuit description hierarchy allows computationally efficient processing of logical circuit increments and produces high-quality outcomes. Users such as circuit designers can exercise a high degree of predictability and control over the resulting physical layout construction by either user-specified or computer-generated constraints.

20 Claims, 7 Drawing Sheets

(56) References Cited

U.S. PATENT DOCUMENTS

| | | | |
|---|---|---|---|
| 8,365,113 B1* | 1/2013 | Bhardwaj et al. | 716/106 |
| 8,527,928 B1* | 9/2013 | Gopalakrishnan et al. | 716/119 |
| 8,539,402 B1* | 9/2013 | Bhardwaj et al. | 716/105 |
| 8,543,955 B1* | 9/2013 | Kaptanoglu et al. | 716/116 |
| 8,555,229 B2* | 10/2013 | Tang et al. | 716/122 |
| 2001/0010090 A1* | 7/2001 | Boyle et al. | 716/2 |
| 2003/0079192 A1* | 4/2003 | Cheong et al. | 716/7 |
| 2003/0084416 A1* | 5/2003 | Dai et al. | 716/7 |
| 2004/0123260 A1* | 6/2004 | Teig et al. | 716/7 |
| 2005/0086626 A1* | 4/2005 | Sato et al. | 716/11 |
| 2005/0155006 A1* | 7/2005 | Subasic et al. | 716/10 |
| 2005/0229140 A1* | 10/2005 | Tsai et al. | 716/17 |
| 2005/0278676 A1* | 12/2005 | Dhanwada et al. | 716/9 |
| 2006/0053396 A1* | 3/2006 | Eng | 716/7 |
| 2007/0204252 A1* | 8/2007 | Furnish et al. | 716/10 |
| 2007/0245281 A1* | 10/2007 | Riepe et al. | 716/9 |
| 2008/0016483 A1* | 1/2008 | Chan | 716/11 |
| 2008/0127000 A1* | 5/2008 | Majumder et al. | 716/2 |
| 2009/0031261 A1* | 1/2009 | Smith et al. | 716/2 |
| 2009/0046100 A1* | 2/2009 | Evans | 345/440 |
| 2009/0199142 A1* | 8/2009 | Arunachalam et al. | 716/5 |
| 2009/0219051 A1* | 9/2009 | Zhang et al. | 326/38 |
| 2009/0254874 A1* | 10/2009 | Bose | 716/6 |
| 2011/0022998 A1 | 1/2011 | Rao et al. | |
| 2011/0023000 A1* | 1/2011 | Dirks et al. | 716/122 |
| 2012/0096417 A1* | 4/2012 | Durbha et al. | 716/103 |
| 2012/0297354 A1* | 11/2012 | Scheffer | 716/122 |
| 2013/0047127 A1* | 2/2013 | Arunachalam | 716/103 |
| 2013/0132042 A1* | 5/2013 | Chan | 703/1 |

OTHER PUBLICATIONS

PCT/US2013/026526, International Search Report and Written Opinion, Dated Jun. 3, 2013, 10 pages.

\* cited by examiner

CONCURRENT PLACEMENT AND ROUTING USING HIERARCHICAL CONSTRAINTS

BACKGROUND

Automated integrated circuit design has traditionally addressed placement and routing as independent and separable processes. For example, a circuit placement process may place all of the required circuit elements or blocks of the integrated circuit in a layout, and then a routing process subsequently attempts to layout signal and power lines to interconnect the circuit blocks with each other and with I/O terminals. While this approach may suffice for layout of many purely digital circuits, separate placement and routing processes have serious shortcomings for generation of analog, mixed-signal, or custom digital circuit layouts. In fact, the deficiencies are generally so severe in analog and mixed-signal design that adoption of automated routing for these types of circuits has been limited. In particular, automated layout of analog and mixed signal circuits has typically been restricted to circuit block connect-up at higher levels in the circuit hierarchy, rather than the device level layout where benefits of automated routing could potentially have the most impact on productivity.

A significant complication in contemporary integrated circuit design for digital, analog, and mixed signal circuits is the complexity of process technology design rules with which layout construction must comply. These complex design rules cause computational challenges at all levels of the design hierarchy but are particularly troublesome at lower-levels in the design hierarchy where one must deal with a large amount of geometrical complexity due to primitive devices (e.g., MOSFETs, resistors, and bipolar transistors), dense highly-structured interconnected groups of primitives (e.g., abutted devices, matching patterns, and arrays), device-level physical pins (e.g., for making routing connections to device-level features), substrate and well contacts, contacts rings, wells, and other low-level geometrical constructs necessary for building electrically and physically valid integrated circuits. The geometrical complexity involved at these levels is one reason why traditional place and route approaches that completely decouple the placement and routing phases of construction may fail entirely or result in layouts of inferior quality.

SUMMARY

A layout process uses constraints from multiple levels in either a single-level or hierarchical circuit description to permit concurrent placement and routing of logically related increments of an integrated circuit. Use of constraints from multiple levels of a circuit description allows computationally efficient processing of logical circuit increments and produces high-quality layouts. The constraints can be either computer-generated constraints or user-specified. For example, circuit designers or other users of automated layout system can thus use hierarchical constraints to exercise a high degree of control over and provide predictability in the resulting physical layout of an integrated circuit. Such a hierarchical constrained layout process may be applied, for example, to complex digital, analog, and mixed-signal integrated circuit designs.

One specific embodiment is a layout process that can be implemented on a computer. The process may include identifying in a description of a circuit, a group of the circuit structures that are associated with a constraint. Further, a set of constraints can be identified that applies to one or more of the circuit structures in the identified group. For example, the set may include constraints that are in a constraint hierarchy between the constraint associated with the identified group and a root of the constraint hierarchy. With the group and the set of constraints, the layout process can place and route the identified group of circuit structures in a layout of the circuit and use the set of constraints to determine placement and routing for the identified group of circuit structures.

Another specific embodiment of the invention is a non-transient computer readable media including instructions which when executed by a processor cause the processor to perform a process. The process including: identifying a group of circuit structures in a description of a circuit, wherein the circuit structures in the identified group are associated with a first constraint; identifying a set of constraints that applies to one or more of the circuit structures in the identified group; and placing and routing the identified group of circuit structures in a layout of the circuit. In the process, the set of constraints are used to determine placement and routing for the identified group of circuit structures.

Yet another specific embodiment of the invention is a system for layout of a circuit. The system includes a memory system storing a description of a circuit and a computer containing a layout engine. The layout engine is configured to: identify a group of circuit structures represented in the description, wherein the circuit structures in the identified group are associated with a first constraint; identify a set of constraints that applies to one or more of the circuit structures in the identified group; and place and route the identified group of circuit structures in a layout of the circuit. The computer uses the set of constraints to determine placement and routing for the identified group of circuit structures.

BRIEF DESCRIPTION OF THE DRAWINGS

Use of the same reference symbols in different figures may indicate similar or identical items.

DETAILED DESCRIPTION

Figure 1A:
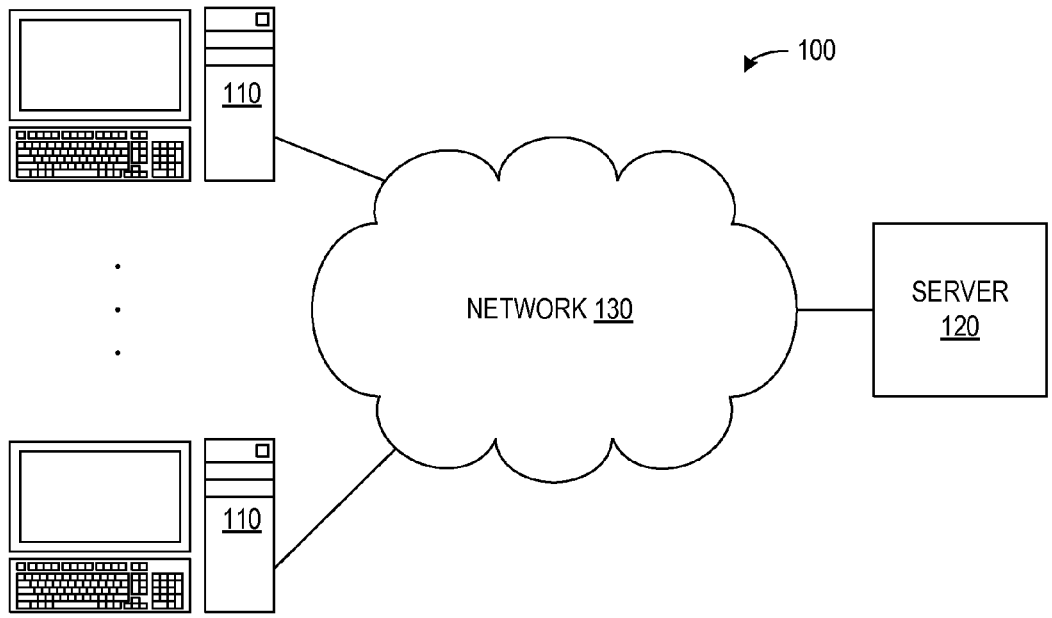
FIGS. 1A and 1B are block diagrams showing computing systems for automated integrated circuit design and layout using concurrent placement and routing based on knowledge-driven hierarchical constraints.

An automated integrated circuit (IC) layout system or process can use multi-level hierarchical constraints associated with a circuit description to determine how to incrementally perform simultaneous circuit placement and signal routing. The constraints can indicate relationships such as the alignment and symmetry of circuit structures and can be used to identify logical increments of the circuit in which simultaneous placement and routing may be locally efficient and lead to an efficient overall layout for the circuit. In particular, the circuit structures associated with one level of the constraint hierarchy may be placed and routed using a plan that is based on the constraints in multiple levels of the constraint hierarchy. Accordingly, the layout and routing of each portion of the circuit is effectively performed with "knowledge" of how that portion is related to the circuit as a whole. The resulting layout of an IC can efficiently use wafer area and improve electrical characteristics of routing.

A constraint hierarchy can be generated automatically or manually. For example, a computer executing appropriate program code can analyze a net list or other description of an integrated circuit and identify constraints that must, should, or may be placed on the layout of the integrated circuit. Alternatively, a circuit designer can create or add constraints to a circuit description or while a circuit description is being created.

The effects of placement and routing processes are tightly intertwined, with a multitude of intricate interdependencies and interactions. A layout engine may produce high-quality layouts, particularly for analog, mixed-signal, and custom layout generation by respecting the interdependencies of placement and routing and by performing placement and routing simultaneously, instead of as independent and separable processes. In accordance with an aspect of the invention, a layout engine may perform placement and routing simultaneously, or if not truly simultaneously, then in an incremental predictive or anticipatory manner. The layout process can involve grouping circuit elements into logical, meaningful, or conventional substructures or increments (e.g., interdigitated primitive devices, matched or symmetrized constructions, and arrayed or aligned groups to name a few) and then the placement and routing of these increments can be performed in conjunction with consideration of the higher-level "contexts" of each increment. This deconstruction of complex circuit designs into sets of context-dependent meaningful layout increments can be a highly effective divide-and-conquer strategy allowing management of significant design complexity while also achieving optimal, high-quality layout constructions.

An automated layout process may accordingly be based on identification of meaningful substructure, groups, and contexts in an IC design. This design knowledge may particularly be represented and captured formally using "constraint groups" and particularly hierarchical constraint groups or constraint hierarchies. A constraint group may be a set of actual physical circuit elements that are affected by a constraint, and with hierarchical constraints, a constraint group may include one or more instances of other constraint groups. A constraint group that contains another constraint group is of higher order in the constraint hierarchy than is the contained constraint group. A constraint group can take different forms, i.e., have different layout or routing, in different constraint hierarchies. In particular, the layout and routing selected for circuit elements associated with a constraint group can be selected not only according to the constraint associated with that group but also according to constraints that are higher in the constraint hierarchy. Use of hierarchical constraint groupings may not only allow transparent representation of design structure that are intuitive to human users but may also enable users to select attributes applied to the various circuit groupings in order to influence implied design styles and computed outcomes in a circuit layout. To avoid confusion with the traditional notion of hierarchical circuits, where a large electrical circuit is broken down into hierarchical sub-circuits, constraints here are hierarchical in that the constraints themselves are of a hierarchical and embedded nature (i.e., a constraint group can apply to other constraint groups or "contain" other constraint groups).

FIG. 1A is an exemplary configuration of a system 100 that may be used for automated IC design and layout. System 100 includes one or more user devices 110 that may be configured to communicate with each other and with one or more servers 120 over a network 130. Server 120 of FIG. 1A may include a repository or library for storing physical representations of circuit structures in a cell format. In exemplary embodiments, server 120 may store cells that are represented using an open standard database compatible format. Server 120 may also include a computational engine for generating new cells in response to a request for cells which do not already exist in the repository. Network 130 may employ any inter-process communications (IPC) setup. For example, network 130 may include any network, such as the Internet, a wide area network (WAN), a local area network (LAN), or any other type of communication network.

Figure 1B:
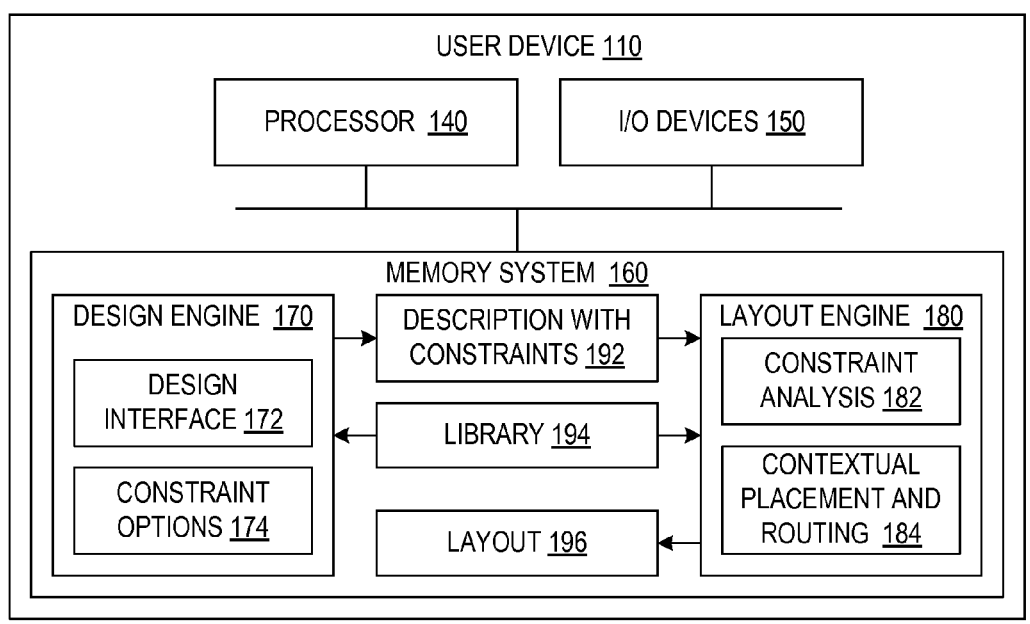

Each user device 110 may be associated with a user such as an IC designer. FIG. 1B illustrates one embodiment of user device 110, which may be a personal computer (e.g., a desktop, a laptop, or pad computer), a workstation, or other processing device. In the illustrated embodiment, user device 110 includes a processor 140, input/output (I/O) devices 150, and a memory system 160. Memory system 160 may include addressable memory such as RAM or ROM, storage devices such as disk drives, and other systems that store information such as program code for execution by processor 140 and data that may be manipulated, processed, created, input, or output during execution of program code by processor 140. FIG. 1B particularly shows a configuration in which user device 110 includes a design engine 170, a layout engine 180, and data 192, 194, and 196. In alternative configurations, some of the program code and data shown in FIG. 1B may not be present in one user device 110. For example, in the environment of FIG. 1A, design engine 170 and layout engine 180 may be in different user devices 110 and data 192, 194, and 196 may be in different user devices 110 or server 120. For example, server 120 may provide a cell server that stores cells that are part of library 194 that layout engine 180 uses during generation of layout 196, which may be stored on user device 110 or elsewhere. In an alternative configuration, the entirety of the automated IC design system may be implemented in a single user device 110 without need of other user devices 110, servers 120, or networks 130.

A user may employ design engine 170 to generate a representation or description 192 of the IC design. For example, I/O devices 150 may include a display on which a circuit schematic may be represented, and a graphic user interface (GUI) may allow the user to create or alter description 192 via user input, for example, through a keyboard or mouse that may also be among I/O devices 150. In an exemplary configuration, design engine 170 may particularly allow a user to directly input or establish constraints in description 192 that affect or control not only the structures and connections in an IC design but also the placement and the routing in a generated layout 196. The file content in the specific format of description 192 is typically generated without user interaction, e.g., generated by design engine 170 in a manner that is transparent to the user. Description 192 may include a single level circuit description or a hierarchical circuit description.

A hierarchical circuit description typically includes a top level and one or more lower levels with each level describing further details of circuit blocks in the higher levels of the description. Additionally, description 192 may include one or more hierarchy of constraints. As noted above, a constraint hierarchy may include constraint groups with at least one lower-level constraint group that is a subset of a higher-level constraint group. Description 192 can be made generally accessible to authorized users, devices, or software modules.

The constraint hierarchy associated with a circuit description is generally independent of whether the circuit description is hierarchical. In particular, a hierarchical circuit description may be represented by a tree structure in which the nodes correspond to circuit blocks or fundamental devices. Each circuit block, not represented by a leaf node, contains circuit blocks that correspond to lower-level nodes that connect to the non-leaf node in the tree structure. Each leaf node of the tree structure corresponds to a fundamental circuit element or a circuit structure corresponding to a cell available in a library for the circuit description. A hierarchical circuit description may include multiple levels that, in addition to a set of circuit block nodes, have signal definitions that indicate connections of the circuit blocks to each other or I/O pads of the IC represented. Hierarchical circuit descriptions are generally employed for complex circuits. A single-level or flat circuit description, which would normally be used for a relatively simple circuit, corresponds to a single schematic that represents the entire circuit. In either case, some nodes or circuit blocks in a circuit description may be subject to a hierarchy of constraints that may relate to the layout of the circuit blocks constrained.

Figure 2A:
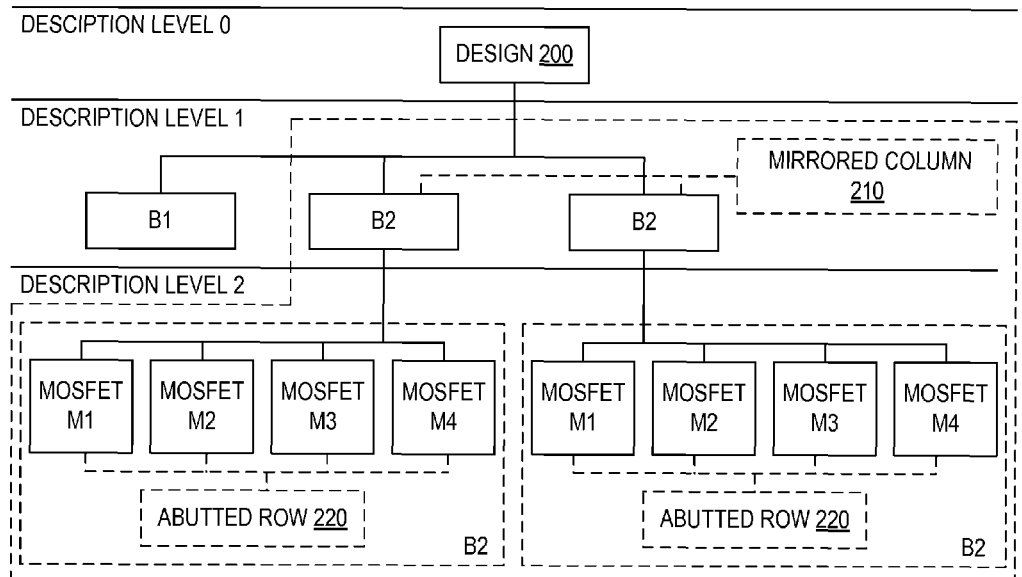
FIG. 2A conceptually illustrates a hierarchical circuit description containing hierarchical layout constraints.

FIG. 2A conceptually illustrates a hierarchical circuit description 200 for a simple IC. Hierarchical circuit description 200 as illustrated includes a root or top node corresponding to the design as a whole and two levels of nodes corresponding to circuit blocks or structures in the design. In particular, each node corresponds to a circuit block that can be a fundamental circuit element or a predefined cell or has contents that are further defined in the next lower level of the hierarchical circuit description. Level 1 in FIG. 2A includes a circuit block B1 and two occurrences of a circuit block B2. The two copies of circuit block B2 are subject to a constraint 210 that the two blocks B2 be arranged in a column. (FIG. 2A uses dashed lines for constraints and solid lines for circuit structures to highlight the distinction between circuit structures and constraints.) An IC designer may specify this constraint 210, or constraint 210 may be identified automatically, e.g., by design engine 170 or layout engine 180 of FIG. 1B. FIG. 2A further illustrates that the contents of circuit structures B2 are defined in level 2 of hierarchical circuit description 200. In the particular example illustrated, each block B2 contains four MOSFETs M1-M4 that are subject to a constraint 220 that the MOSFETs be arranged in an abutted row. Circuit block B1 could similarly be described in level 2 of the circuit description hierarchy, but in the illustrated example, circuit block B1 is assumed to correspond to a standard cell or other circuit block that does not require description in level 2 of hierarchical circuit description 200. Each level of hierarchical circuit description 200 may further include identification of connections or signals used in the IC described, but for simplicity of illustration, signal connections between the circuit blocks are not shown in FIG. 2A.

Constraints 210 and 220 also form a hierarchy that may be independent of the circuit description hierarchy or may be limited by the circuit description hierarchy. For example, each constraint 220 has an associated constraint group containing four MOSFETs and constrains the MOSFETs in the associated constraint group to be arranged in a row. Constraint 210 applies to the two occurrences of circuit block B2 and therefore has a constraint group containing eight MOSFETS that constraint 210 affects. Constraints 210 and 220 can be organized into a constraint hierarchy in that constraint groups associated with constraints 220 are contained in the constraint group of constraint 210 and are subject to constraint 210. The constraint hierarchy including constraints 210 and 220 is independent of the circuit description hierarchy and particularly includes constraints that are applied at multiple different levels of the circuit description hierarchy. Alternatively, constraint hierarchies may be limited by circuit description hierarchy, for example, by limiting the constraints in a constraint hierarchy to include only constraints that are in a single level of the hierarchy or in a single circuit block within a level of the hierarchy.

Figure 2B:
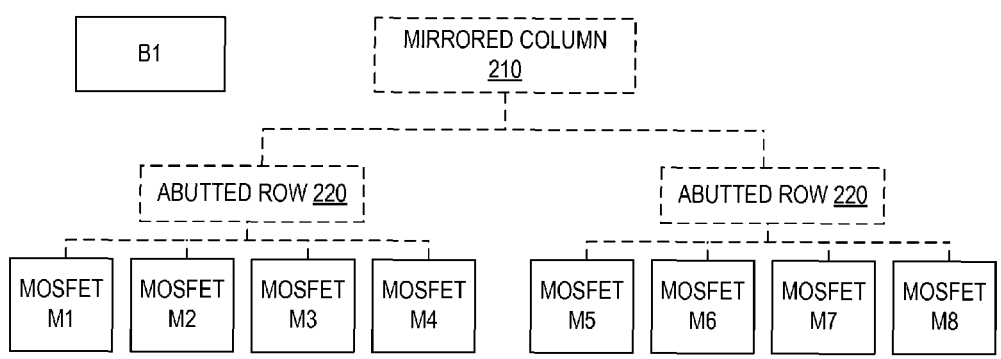
FIG. 2B illustrates a single-level circuit description with hierarchical constraints for the same circuit represented in FIG. 2A.

A tree structure associated with the hierarchical constraints may be better illustrated in FIG. 2B, which uses a single-level or flat circuit description to describe the same circuit as represented in FIG. 2A. With the flat circuit description of FIG. 2B, circuit block B1 and both sets of MOSFETs M1 to M4 and M5 to M8 are on the same level of the circuit description and may be illustrated in the same schematic. Constraints 220 apply to respective groups of four MOSFETs M1-M4 and M5-M8. Constraints 220 are in a lowest level of the constraint hierarchy because neither constraint group associated with a constraint 220, i.e., the group of MOSFETs M1 to M4 or the group of MOSFETs M5 to M8, contains a smaller constraint group. The constraint group for constraint 210 includes MOSFETS M1 to M8 and therefore contains the constraint groups M1 to M4 and M5 to M8 of respective constraints 220, and constraint 210 is therefore in a higher level of a constraint hierarchy including constraints 210 and 220. A simple constraint hierarchy can thus be constructed containing a top-level constraint 210 connected to two lower level constraints 220. A constraint hierarchy more generally may correspond to a tree structure having multiple levels.

Block B1 is not subject to any constraint and is not limited by the constraint hierarchy including constraints 210 and 220. Block B1 could be considered to be subject to a null constraint and associated with a single-level constraint hierarchy that is separate from two-level constraint hierarchy including constraints 210 and 220. More generally, a single circuit description may give rise to one or more constraint hierarchies.

Figure 3:
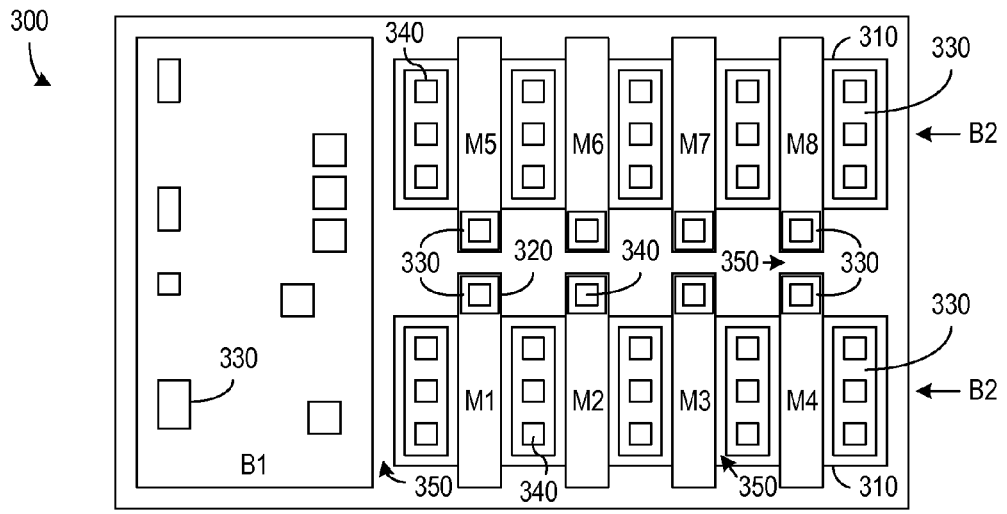
FIG. 3 shows a placement of integrated circuit structures based on the circuit description of FIG. 2A or 2B.

Layout processes that consider constraint hierarchies can avoid or reduce layout problems that might otherwise arise. To illustrate some particular layout issues, FIG. 3 shows a plan view 300 of circuit structures that may be generated from description 200 after placement of circuit blocks or structures B1 and B2 including their respective internal structure but prior to routing of conductive traces that provide electrical connections between blocks B1 and B2. In the illustrated layout, blocks B1 and B2 include IC features such as diffusion areas 310 for source and drain regions of MOSFET M1 to M8, polysilicon regions 320 for transistor gates, metal 1 regions 330, and contact vias or pins 340. The placement of IC features in plan view 300 was determined independently of a subsequent routing task, which may have created problems that are difficult or impossible to solve during a subsequent routing process.

Figure 4A:
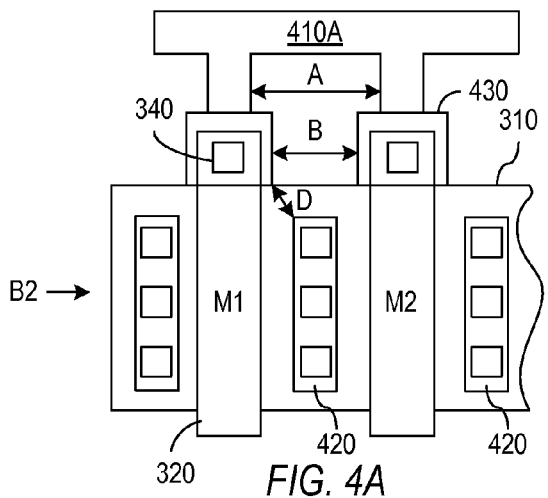
FIGS. 4A and 4B show one placement with alternative routings that may be employed in a portion of a layout based on the circuit description of FIG. 2A or 2B.
Figure 4B:
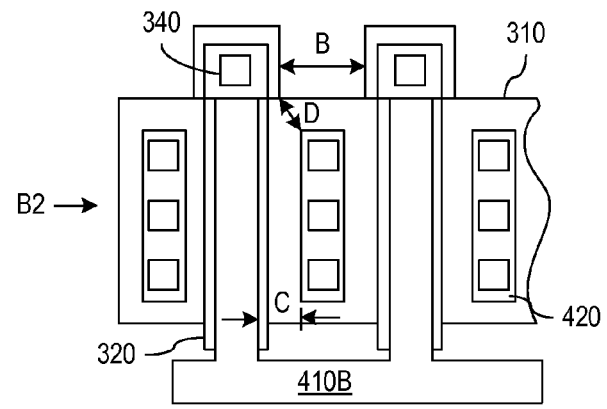

One problem with layout 300 is that the spacing 350 between circuit features may not be able to accommodate reasonable routing paths for signals or power. In particular, process technologies for fabrication of integrated circuits generally impose a variety of rules on the paths and shapes of interconnects. Accordingly, the physical routes generally have minimum widths, maximum widths (possibly necessitating striping, as frequently happens with power supply routing), conditional minimum spacing to other features, line end spacing, and complex conditional via and contact enclosure and extension requirements. FIGS. 4A and 4B specifically show a portion of layout 300 with alternative routings of conductive traces 410A and 410B that may connect to polysilicon gate regions 320 through vias 340 of FIG. 3. The layout of polysilicon regions 320 for placement purposes and without concern for routing can create some fundamental structural issues. In particular, some of the structural issues related to routing feasibility and design-rule compliance include line-to-line minimum spacing A for gate routing 410A, side-to-side spacing B after accounting for contact enclosure and extension requirements 430, spacing C for routing 410B to source/drain connections 420, or corner-to-corner spacing D between gate routing 410A or 410B and source/drain routing 420. A process that places features 310, 320, and 340 without regard to routing issues can result in a placement that is unable to accommodate desired routing 410A or 410B that satisfy all of the applicable design rules. For example, a particular placement may be able to accommodate one routing 410A of FIG. 4A, while a routing 410B of the type shown in FIG. 4B is illegal due to DRC errors.

If a subsequent routing process finds that placement 300 does not provide necessary space for signal routing that satisfies the relevant design rules, the routing process after initial placement might attempt to shift the circuit features 310, 320, 330, and 340 to make space for routing. However, such a strategy can fail for a number of reasons. For example, if a circuit block in the center of a tightly packed array of circuit blocks doesn't have enough space for routing, the central circuit block cannot be moved without moving all of the blocks that encircle that central block. Essentially, the entire placement may need to be torn apart and redone again. Further, if the resulting side effects of the new routing problems of the other blocks are not addressed, a layout process may be stuck redoing the placement ad infinitum in a vain attempt to make all of the tightly packed blocks routable. Even when circuit features can be moved to provide sufficient space for routing, separating the circuit features can produce a poor quality of layout with sub-optimal area utilization and high-impedance signal flow.

Figure 5:
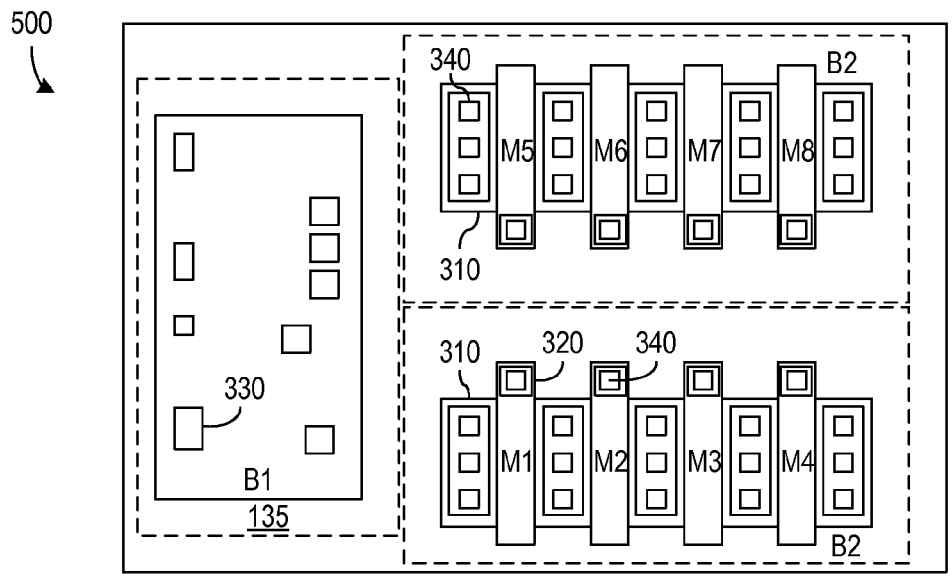
FIG. 5 shows a placement of integrated circuit structures in a layout that provides additional area in anticipation of a subsequent routing process.

FIG. 5 shows an example of a placement 500 in which each circuit block B1 or B2 is placed to provide additional space to accommodate the subsequent routing of conductive traces. However, a placement process that simply provides extra space around circuit structures may not provide the correct amount of space in the correct areas for desired routings meeting necessary design rules. Specifically, the amount of added space and the location of the added space may be selected for a generic or specific style or plan of routing and may not be correct or optimal for the actual routing. This can particularly be a problem when the actual routing selected depends on the choices made during or for the routing or during placement process. For example, different choices of routing in a circuit block B1 or B2 may be made depending electrical requirements such as impedance matching of signal lines, which may particularly be important for analog or mixed analog-digital circuits. Different choices may also be made based on the location of other blocks to be connected or based on preferences in the relative placement of circuit blocks.

One strategy for mitigating some of the problems described above is to inject "global route" analysis into the decoupled placement and routing processes. With this strategy, a layout engine may perform a global route analysis that attempts to estimate the amount of inter-element space required to support all required routing capacity and route-related design rule requirements. The space around each circuit structure B1 and B2 in placement 500 may thus be allocated according to the global route analysis. This strategy may provide desirable results in structured digital standard cell based place and route processes, but a global route analysis may not be particularly beneficial in analog, mixed-signal, and custom layout methodologies. In particular, although the placement process may increase the routing spacing and improve the chance that routing completion is feasible, the estimate of the necessary space does not guaranteed that the routing process can in fact find a routing that satisfies all of the route-related design rule requirements. Even in cases where only inter-device routing is concerned, there is also no guarantee that enough room for all routing and design rules has been provided. In fact, an estimation and allocation of space for routing is likely to waste significant area in some locations and fail to provide sufficient space in other locations. This may be because the global routing analysis attempts to determine the requirements of the routing with little or no knowledge of where and how the detail routing will be constructed. Global-route analysis has little to no applicability in custom layout methodologies where adequate rules for estimating the required global routing areas may not be available.

Figure 6A:
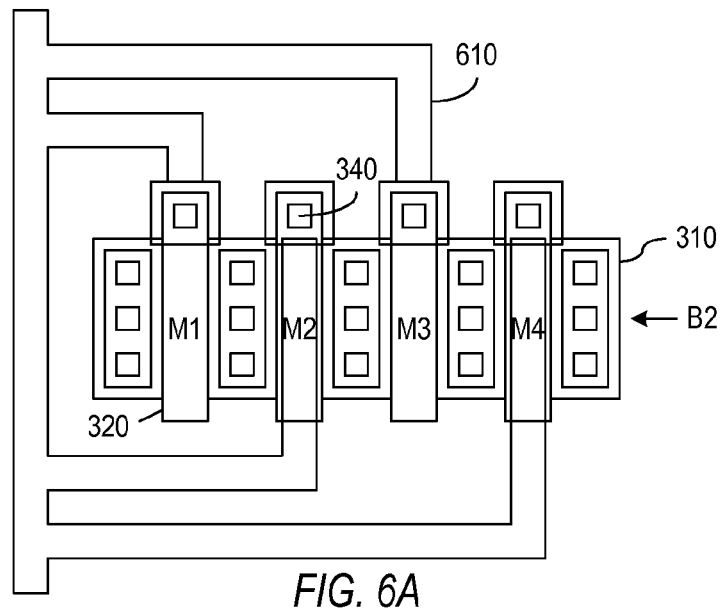
FIGS. 6A and 6B illustrate different types of routing that may be employed in a portion of a layout based on the circuit description of FIG. 2A or 2B.
Figure 6B:
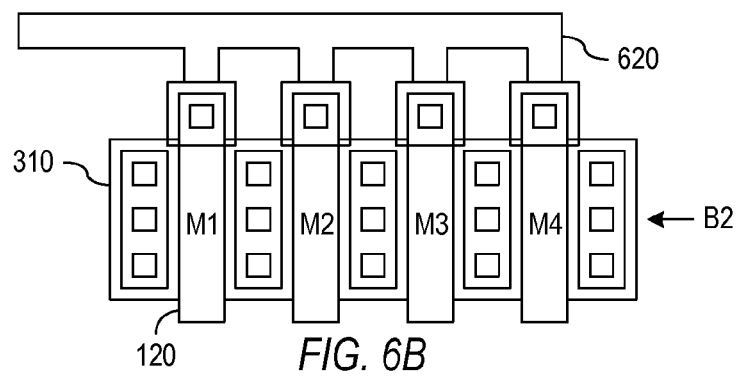

FIGS. 6A and 6B show alternative possible auto-router-generated gate connections 610 and 620, respectively. Each routing 610 or 620 may have electrical or space advantages or disadvantages in different contexts. In the illustrated examples, routing 610 uses space on both sides of circuit block B2, while routing 530 provides a compact or area-efficient routing. A routing process lacking information or context regarding the underlying circuit structures may be unable to determine or identify which routing 610 of FIG. 6A, routing 620 of FIG. 6B, or some other routing may be best in a specific circuit. Selecting placement of circuit structures or additional space around a circuit structure is thus subject to inefficiency and error if made before the routing is selected.

The routing process may similarly benefit from knowledge of the nature of the structures and the placement of circuit structures in a layout. For example, placement and routing can affect matching requirements in analog circuits or well-structured track routing in row-like and column-like formations. Also, particular device types, like MOSFETs in abutted or interdigitated rows, have well understood and useful conventional routing strategies. A routing process operating without any consideration, knowledge, or hints as to the circuit structure types or implied natural ordered of the underlying or higher level placement constraints might easily produce routing with undesirable characteristics.

Figure 7:
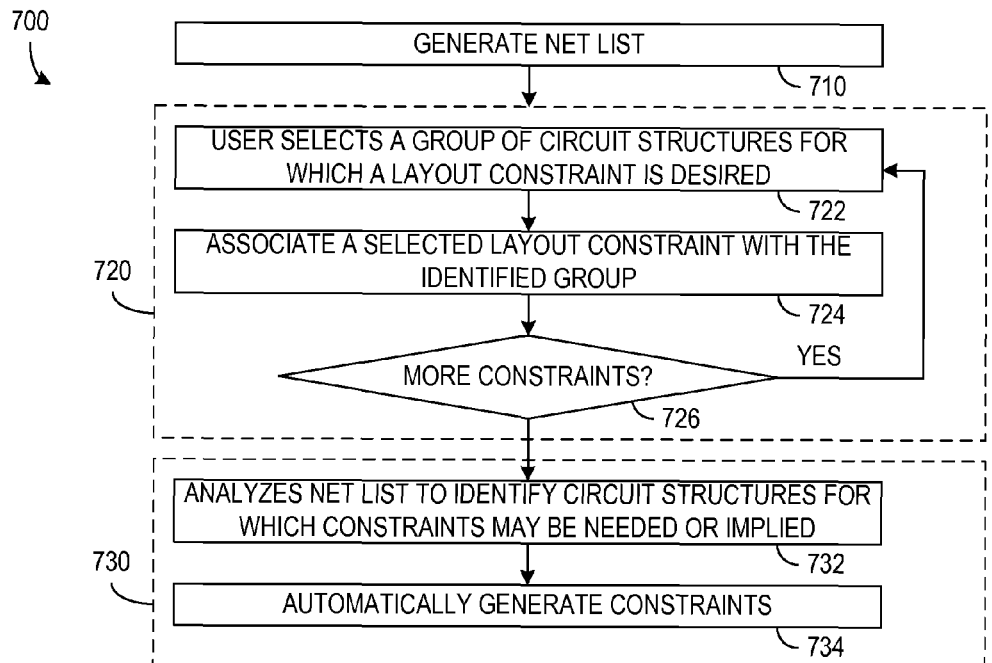
FIG. 7 is a flow diagram of a process for generating a hierarchical layout constraint description.

FIG. 7 is a flow diagram of a process 700 for generating a circuit description that contains hierarchical layout constraints. Process 700 may be implemented by one or more users or circuit designers operating a computing system or environment such as described above with reference to FIGS. 1A and 1B. The following describes an example which refers to a user performing actions, but in general, the actions may be performed by multiple users or circuit designers and associated computing system. In an exemplary embodiment, process 700 includes three steps or sub-processes, which are net list generation 710, user-defined constraint generation 720, and automated constraint generation 730. FIG. 7 shows sub-processes 710, 720, and 730 as being separate and sequential steps as an illustrative example but more generally sub-processes 710, 720, and 730 can be performed in different orders or mixed or interleaved in different implementations. Further, user-defined constraint generation 720 and automated constraint generation 730 may be completely separate process, so that either process 720 or 730 may be performed without performing the other process 730 or 720.

The net list generated in step 710 represents a circuit, e.g., a digital, analog, or mixed signal integrated circuit, to be laid out. Many techniques for generation of a net list are known and could be employed in step 710. In general, the net list describes electrical components and electrical connections in a circuit and may correspond to a hierarchical or single-level circuit description such as described above.

A user in step 720 selects and applies a layout constraint to a portion of the net list. In particular, in step 722, a user can select a group of circuit structures that will be subject to a layout constraint, and step 724 associates the selected circuit structures with the constraint that the user selected for the group. Decision step 726 creates a loop in which step 722 and 724 can be repeated to permit the user to apply as many constraints as desired. The group of circuit structures selected in step 722 may be referred to as a constraint group, and a constraint group may include basic circuit elements and predefined cells that may or may not already be subject to other layout constraints and may particularly include one or more other constraint groups. The selected constraint may be associated with the group of circuit elements by creation of a data structure having an entry that identifies the constraint, any circuit structures in the constraint group, and any other constraint groups in the current constraint group. As noted above, constraints may form a hierarchy, so that computing techniques for representing hierarchies or tree structures can be used to represent the relationships of constraints to circuit elements and other constraint groups.

Step 730 is a process in which a computing system generates constraints based on an analysis of all or a portion of the net list or circuit description. In step 732, a computing system can analyze a net list, for example, to detect repetitions of identical or similar circuit elements or repetitions of signal connections and identify one or more particular constraints that may lead to efficient layout of those circuit elements. In another example, a computer performing step 732 can identify conventional circuit sub-topologies, e.g., a circuit structure combination fitting a description in a predefined list of topology definitions, and constraints that are known to be suitable for the identified circuit sub-topology can be automatically applied. A simple example of such mechanical analysis may employ electrical topology analysis to find all differential pairs in a net list and then generate hierarchical constraints to match and mirror all such differential pair groups. In step 734, the constraints thus generated can be recorded in a data structure, e.g., in the same manner as described for step 726.

Constraints, in general, may indicate almost anything related to the construction or computation of a layout or to physical or electrical requirements of the layout. Types of constraints can range from: simple topological directives, such as placing devices, groups, or entities in a specific physical configurations, e.g., a horizontal aligned row, a vertical aligned column, or an aligned array of device instances; or could be directives which request layout to be computed with some kind of physical or electrical optimization goals, e.g., minimize area when packing device instances, or minimize electrical routing lengths when placing devices in the layout. Constraints may also be directives which just influence some simple parameters on physical entities in the layout. For example, a user could use a constraint to indicate the desired width or spacing on an electrical route or electrical routing layer, e.g., a metal layer. Constraints can also include directives which allow users to generate additional useful geometric or electrical layers or specify geometries or layout to an existing device instance or a group of device instances. For example, a constraint may designate addition of large stripes of metal routing layers on the device or devices to support layout of power supply connections, or add contacts and diffusion layers around devices or groups of devices to create electrical "guard rings," which might not be designated or required in a schematic or description of the circuit. Some other constraints that address electrical features not in the circuit description include electrical connections into N-wells or into the semiconductor wafer substrate to create proper device electrical connections, noise isolation, or reduce latch-up to name a few. Constraints can also be used to indicate that empty space should be inserted into the layout or added around certain devices or groups of devices, e.g., a halo or island of empty space around a device. Constraints can further be included to influence the physical style in which routing is constructed, e.g., array or track based routing or matched or symmetrical routing. The above examples do not constitute an exhaustive list of possibilities for constraints, but rather are an attempt to illustrate a fairly broad range of constraint types that a layout system can handle.

Figure 8:
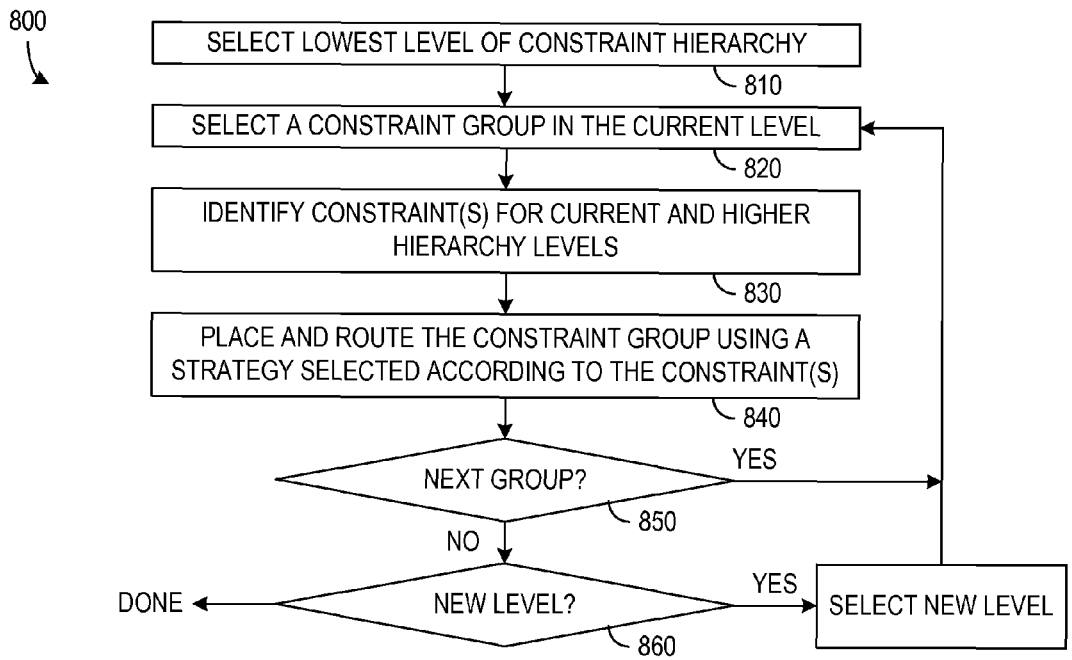
FIG. 8 is a flow diagram of a process for generating a layout using knowledge-driven concurrent placement and routing.

FIG. 8 is a flow diagram of one example of a layout process 800 employing hierarchical constraints from a circuit description in knowledge-driven, concurrent determination of the placement of circuit structures and the routing of conductive traces or interconnects. Process 800 begins in step 810 by selecting a constraint hierarchy and selecting the lowest level of the constraint hierarchy as a current level. As noted above, a circuit may be subject to multiple independent constraint hierarchies, which may be limited by a circuit description hierarchy or not. When a hierarchical circuit description is available, process 800 may be employed to sequentially layout circuit blocks from the hierarchical description, and each circuit block may contain one or more constraint hierarchy that may be employed as described below to select circuit increments for simultaneous place and route processes. Alternatively, process 800 may ignore a hierarchical circuit description and treat the circuit description as a flat or single level circuit description. An advantage of performing process 800 within the limits of blocks of a hierarchical circuit description is that the manner in which a circuit designer constructed the hierarchical circuit description may suggest layout preferences. On the other hand, an advantage of ignoring or flattening the circuit description hierarchy is that choices for placement and routing of a circuit increment may be made according to larger constraint hierarchies that may better indicate contexts of the circuit increment within the entire circuit.

The example of process 800 shown in FIG. 8 describes layout and routing based on a single constraint hierarchy. Process 800 may be repeated for multiple hierarchies associated with a circuit. The exemplary embodiment of process 800 also proceeds from low to high level in the hierarchy, although this order is not strictly necessary. The current level of the constraint hierarchy may generally include multiple constraint groups, and step 820 selects one of the constraint groups associated with the current level of the hierarchy. The selected constraint group corresponds to an increment of the circuit that will be simultaneously placed and routed. The computing system in step 830 identifies constraints that may affect the currently selected constraint group. Constraints that may affect a constraint group generally include not only the constraint directly associated with the constraint group but also constraints that are associated with other levels in the constraint hierarchy. In step 830, the computing system may follow a tree structure from the current constraint group to higher levels of the constraint hierarchy and at each level identify constraints that affect the current constraint group.

Step 830 captures knowledge-driven hierarchical constraints that may have been entirely human-designated, completely mechanical (computed automatically), or a hybrid of both. Step 830 may thus identify constraints that were previously associated with the circuit description, e.g., in design process 700, or step 830 may include further analysis of the circuit description and generation of constraints as part of the layout process. In typical practical application, a hybrid approach, where obvious information that can be inferred or derived directly from a schematic or net list (i.e., the representation of the electrical circuit topology) is computed automatically, and higher-order design preferences or nuanced layout construction preferences specific to a given IC are entered by the design engineer manually, e.g., as described above for step 720 of FIG. 7. Examples of information that might be derived mechanically from a schematic or net list would be primitive device types (e.g., a MOSFET, resistor, or hierarchical sub-circuit instance), device sizing parameters (e.g., MOSFET length, width, number of segments), and electrical connectivity, which is important, for example, for signal flow analysis and adjacent device abutment validity. Some examples of constraints which might be entered directly by the design engineer would be grouping of devices, symmetry arrangements, MOSFET interdigitation patterns, and alignment groupings. However, much of this higher-order constraint information could potentially be identified automatically by a computer executing a layout engine. For example, the layout engine executed on a computer could implement the same logic circuit designers use to capture their design preferences as abstract concepts. Software routines in a layout engine could thus mechanically analyze and infer higher-order constraint information directly from a net list or schematic.

The layout engine in a concurrent place and route process 840 determines both a placement of the current constraint group in the layout and a routing for signals of the current constraint group. In particular, the type or style of routing applied to the current constraint group can be selected based on all of the constraints that apply to circuit elements in the current constraint group and to the types of circuit elements in the constraint group, and the placement of the circuit elements can be chosen based on the selected routing or on the applicable constraints and types of circuit elements.

A simple example of concurrent place and route process 840 may be illustrated with reference to the hierarchical circuit description of FIG. 2A. For example, each MOSFET in each occurrence of block B2 in the circuit description 200 of FIG. 2A is affected by two constraints. Specifically, each MOSFET is subject to a constraint 220 that the MOSFET is in a block of four MOSFETs in an abutted row, and a constraint 210 that that block is in a mirror column with another similar block. The layout engine further knows that the electrical devices in these stacked rows are MOSFET devices. From that, a computational process in step 840 can infer certain placement and routing requirements that need to be handled in a manner appropriate for MOSFET devices, such as abutment, spacing of routing from gate-to-gate as described above with reference to FIG. 4. The concurrent placement and routing process 840 can thus anticipate interactions between placement and routing and take the appropriate actions during layout construction. The correct electrical abutment configurations for MOSFET placement can be computed, and if needed, additional spacing between the MOSFET fingers can be inserted while routing is constructed. The selection of the MOSFETs in a constraint group associated with a block B2 as the increment for simultaneous placement and routing is "knowledge-driven." In particular, the increment can either be determined from net list analysis or human-driven requirements or desires for the circuit intent. The human user, in effect, is able to determine the appropriate level of granularity for decomposition of the circuit, based on factors such as electrical requirements and conventions. Additionally, since the hierarchical constraint context indicates that the MOSFETs are to be configured into abutted, aligned rows, the concurrent place and route process 840 can apply well-ordered route connections for the MOSFETs which meet expected conventions for MOSFET devices that have been packed into abutted rows. Due to the incremental concurrency of the placement and routing, all of these operations can be done both in the appropriate style for the circuit increment, the appropriate style to connect with other increments, and with full compliance to all applicable design rules, no matter the complexity of the design rules. Further, the place and route process 840 can use not only the constraint directly defining a constraint group but also the higher order constraint that two rows of MOSFETs are placed into a vertical symmetry stack. Thus, the underlying placement and routing can be constructed in a fully symmetrical manner, and furthermore, when constructing the symmetry stack itself, the design rule spacing within the symmetry stack can account fully for both the placement and all of the routing. In some prior decoupled placement and routing approaches, the routing is treated as an afterthought to the placement, and thus one frequently finds it is impossible to create routes that are properly structured and which also meet all required design rule spacing. Concurrent placement and routing can avoid these problems because the routing and placement are created together in a manner that may respect the circuit designer's desired layout styles and structure.

Figure 9A:
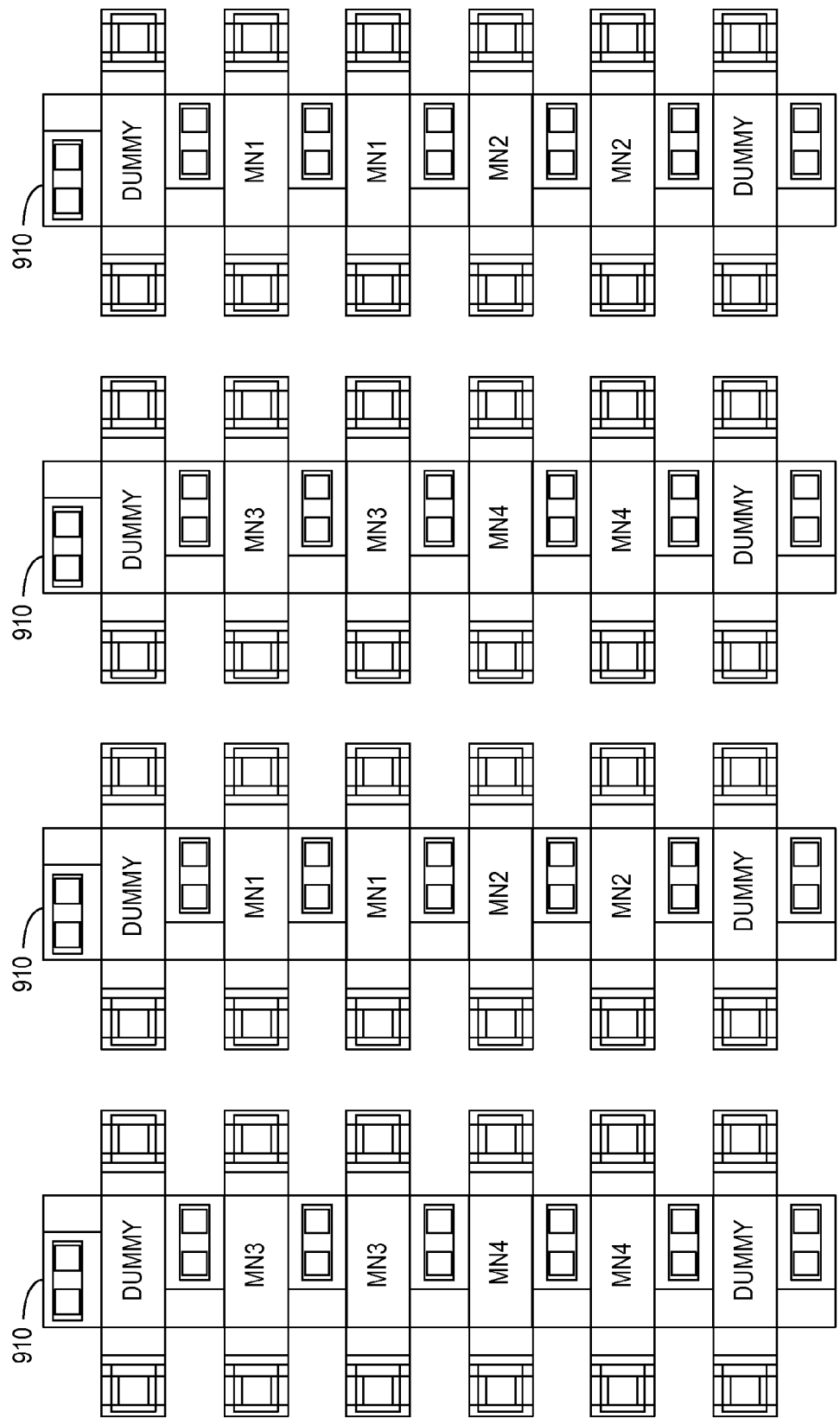
FIG. 9A illustrates a placement of circuit structures without consideration for routing.
Figure 9B:
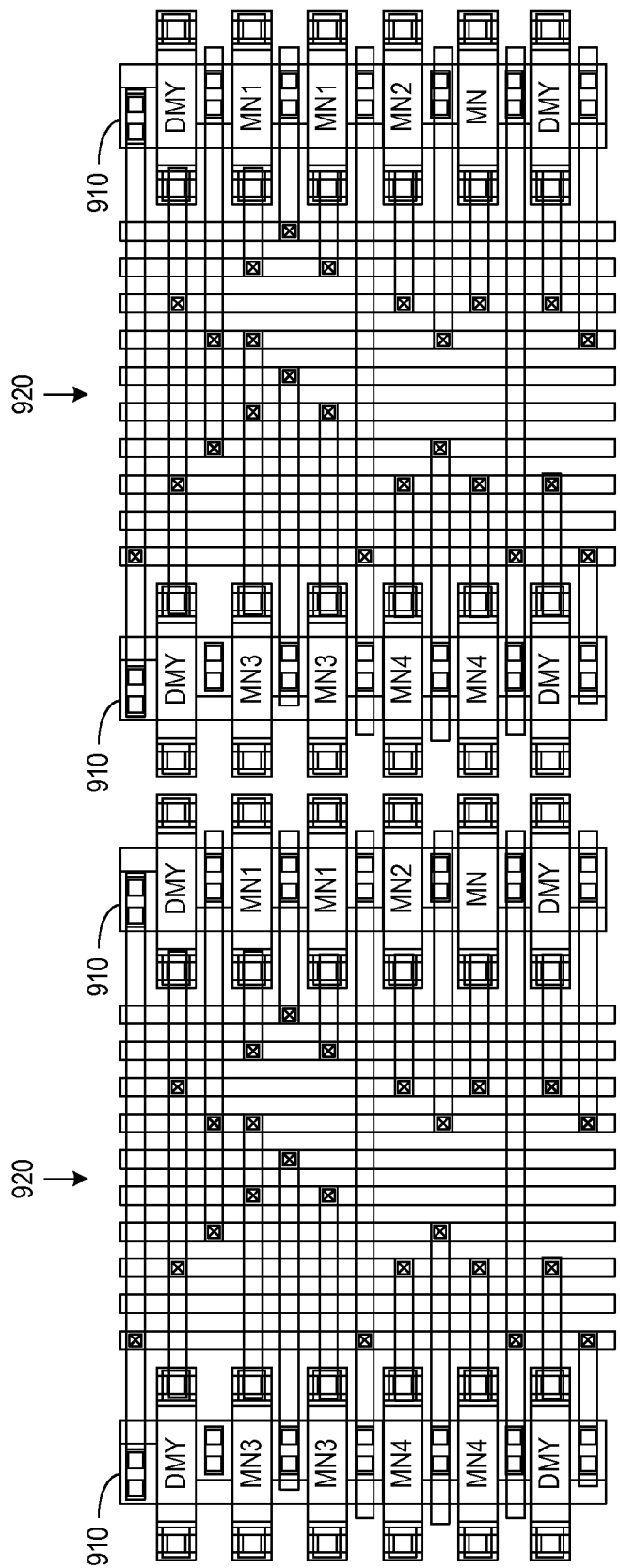
FIG. 9B illustrates placement and routing of the circuit structures of FIG. 9A.

FIGS. 9A and 9B further illustrate how concurrent placement and routing using knowledge of constraints can improve a layout process. FIG. 9A illustrates a densely abutted, matched set of MOSFET devices placed in four columns 910 without any consideration of routing, and FIG. 9B shows the placement and routing that can be generated simultaneously using our knowledge-driven concurrent hierarchical placement and routing approach. Densely-abutted, fingered MOSFET structures such as illustrated in FIGS. 9A and 9B are common in current CMOS analog and mixed-signal ICs. Moreover, due to the density of the primitive devices, pins, and geometries in such structures, such MOSFET structures also happen to be some of the most difficult to handle properly with some prior automated routers. As seen in FIG. 9B, extensive space is required between some columns 910 for routing 920, while minimal space is sufficient between other columns 910. By performing a simultaneous place and route task which respects the natural substructure, sufficient routing space is easily and naturally provided to accommodate layout requirements including placement, routing, connectivity and all necessary design rules. Further, wafer area is not wasted by allocating areas where the actual routing is not needed. Had a layout process that treated placement and routing as separable by performing the placement first, without any consideration or anticipation of routing, e.g., as shown in FIG. 9A, fails to provide sufficient space successful completion of quality layout construction. On the other hand, a layout process that provided additional wafer adjacent to each column 910 in anticipation of the later routing process but without knowledge of the specific routing that will be used could waste space where routing is not needed and may still provide insufficient space where routing is required.

Step 840 of FIG. 8 through use of the context groups may provide better results than would a layout process that performed incremental place and route process on increments that are not selected according to meaningful layout constraints. For example, a layout approach may arbitrarily selected a portion of a circuit for the local placement and route based solely on the local placement, then iterate until the entire layout is completed. However, such processes tend to be unstructured, lack context for routing decisions, and lack consideration of the global optimality or implicit underlying order or structural needs. A layout generated using such an approach to concurrent placement and routing may thus end up with highly irregular routes that are also generally longer than necessary. However, the layout approach using arbitrary increments may solve many of the issues related to routing capacity and design-rule correctness due to the fact that place and route are interleaved at a fairly primitive incremental level.

Layout process 800 of FIG. 8 after placing and routing the current constraint group in step 840 determines in steps 850 and 860 whether there is another related constraint group. If so, the layout engine branches from step 850 back to step 820 determines placement and routing for the next constraint group in the current level. For the specific example of process 800, step 850 particularly determines if there is a next constraint group from the current level of the constraint hierarchy to process. If not, the layout engine determines in step 860 whether another level in the constraint hierarchy contains a constraint group for which placement and routing is needed. Process 800 is done when step 860 determines that all related constraint groups, e.g., all constraint groups in the constraint hierarchy, have been placed and routed.

The layout is done when all circuit structures have been placed and routed. As described above, an entire net list can be covered by one or more constraint hierarchies. Some of those constraint hierarchies may be single-level and may contain a null constraint, i.e., no constraint. However, process 800 may be able to provide a more efficient layout for each portion of the net list corresponding to a multilevel constraint hierarchy and provide a more efficient total layout for the entire circuit. In particular, process 800 may be able to produce layouts that efficiently use wafer area and provide efficient signal routing through use of circuit context indicated by constraints. Process 800 may additionally reduce the processing burden on a computing system. For example, an alternative layout process may start by flattening the entire circuit hierarchy into a single level for circuit structure placement then attempt to route the entire layout. However, concurrent placement and routing of the entirety of a complex circuit design is a complex problem that may be impractical or impossible with current computing systems.

The knowledge driven decomposition of the design and layout process according to constraints can be a very powerful mechanism from a computational standpoint. Since the constraint groups provide meaningful increments or granules and contexts, one can implement a very powerful concurrent placement and routing approach which has many of the same desirable attributes as a manual layout flow that a human might employ. In particular, an automated constraint driven layout process can be very computationally efficient, provide high quality layout outcomes, and provide circuit designers with a high degree of predictability and control. At least some computational benefit may arise because the hierarchy or relationships of the constraints allow the place and route processes to both benefit from top-down contextual information and also bottom-up incremental granularity. The top-down context inferences allow a certain amount of human-like "predictive" capability. For example, lower level devices and groups in the constraint hierarchy "understand" what higher-level hierarchical constructs in which they are "contained." The place and route process can accordingly take advantage of this information to create IC layouts in more appropriate or human-like manner. On the other hand, the bottom-up granularity offers potential computational efficiency since automated calculations may operate on natural, possibly separable, meaningful increments that can be processed in an incremental manner. In particular, the desired concurrent, incremental placement and routing synergy may thus be naturally enabled because increments identified with constraints may provide the necessary information for an efficient placement and routing for a separable increment without the need to place and route the entirety of the circuit. This not only dramatically increases computational efficiency, but allows higher quality, possibly more human-like, layout construction since concurrent placement and routing arrangements and adjustments can be computed based on the local structures at hand and the current top-down context.

Some of the layout examples described above are artificially simple and abstract in an attempt to focus on fundamental principles and ideas. However, the simple examples are intended to illustrate the power of concurrent placement and routing when applied to complex circuits that may be described using a hierarchical description with many levels.

Some embodiments of the above invention can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although the invention has been described with reference to particular embodiments, the description is only an example of the invention's application and should not be taken as a limitation. For example, although the above examples primarily focus on situations in which constraints can be organized in hierarchies, other implementations may be able to employ sets of nested or related constraints that may or may not be organized in a hierarchy. Various other adaptations and combinations of features of the embodiments disclosed are within the scope of the invention as defined by the following claims.

What is claimed is:

1. A layout process comprising:
   identifying with a computer a group of circuit structures in a description of a circuit, wherein the circuit structures in the identified group are subject to a layout constraint in a constraint hierarchy associated with the description of the circuit, wherein at least a portion of the constraint hierarchy is defined by a user, wherein the constraint hierarchy defines relationships between layout constraints;
   identifying a set of layout constraints in the constraint hierarchy that applies to one or more of the circuit structures in the identified group; and
   placing and routing the identified group of circuit structures in a layout of the circuit, wherein the set of layout constraints are used to determine placement and routing for the identified group of circuit structures, wherein the routing comprises detailed routing, wherein the placing and detailed routing for the identified group of circuit structures are performed concurrently.

2. The process of claim 1, wherein the steps of identifying a group of circuit structures, identifying layout constraints, and placing and routing of the identified group of circuit structures are repeated sequentially to incrementally generate the layout of the circuit.

3. The process of claim 1, wherein a set of types of the circuit structures in the identified group are identified, wherein the placement and routing depend on the identified set of types.

4. The process of claim 1, wherein the set of layout constraints includes layout constraints from different levels in the constraint hierarchy.

5. The process of claim 4, wherein:
identifying the group of circuit structures comprises selecting the layout constraint from a particular level in the constraint hierarchy and identifying circuit structures in the description that are limited by the layout constraint; and
identifying the set of layout constraints comprises identifying one or more layout constraints that are in the constraint hierarchy between the particular level and a root level of the constraint hierarchy.

6. The process of claim 5, wherein the steps of identifying a group of circuit structures, identifying layout constraints, and placing and routing of the identified group of circuit structures are repeated sequentially until the groups of the circuit structures that correspond to the particular level of the constraint hierarchy have been laid out.

7. The process of claim 4, wherein the description of the circuit has a hierarchy, wherein each layout constraint in the constraint hierarchy is associated with a single level of the hierarchy of the description of the circuit.

8. The process of claim 4, wherein the description of the circuit has a hierarchy, wherein each layout constraint in the constraint hierarchy is associated with multiple levels of the hierarchy of the description of the circuit.

9. The process of claim 1, wherein the layout constraint is of a type selected from a group consisting of:
a directive indicating a topology for the layout of the group of circuit structures;
a directive indicating a geometry to be used in the layout of the group of circuit structures;
a directive indicating a size of a feature in the layout of the group of circuit structures;
a directive that layout of the group of circuit structures be computed to optimize a physical or electrical goal;
a directive that limits a parameter of the layout of the group of circuit structures;
a directive indicating placement of the group of circuit structures in one or more doped wells in an integrated circuit;
a directive to include empty space in the layout of the group of circuit structures; and
a directive indicating a style of routing to be employed in the layout of the group.

10. A non-transient computer readable media including instructions which when executed by a processor cause the processor to perform a process comprising:
identifying a group of circuit structures in a description of a circuit, wherein the circuit structures in the identified group are subject to a layout constraint in a constraint hierarchy associated with the description of the circuit, wherein the constraint hierarchy is defined by a user and defines relationships between layout constraints;
identifying a set of layout constraints in the constraint hierarchy that applies to one or more of the circuit structures in the identified group, wherein the set of layout constraints includes layout constraints from different levels in the constraint hierarchy; and
placing and routing the identified group of circuit structures in a layout of the circuit, wherein the set of layout constraints are used to determine placement and routing for the identified group of circuit structures.

11. The non-transient computer readable media of claim 10, wherein:
identifying the group of circuit structures comprises selecting the layout constraint from a particular level in the constraint hierarchy; and
identifying the set of layout constraints comprises identifying one or more layout constraints that are in the constraint hierarchy between the particular level and a root level of the constraint hierarchy.

12. The non-transient computer readable media of claim 10, wherein one of the set of layout constraints designates addition of large stripes of metal routing layers on the layout of the circuit, or adds contacts and diffusion layers around the layout of the circuit.

13. The non-transient computer readable media of claim 10, wherein one of the set of layout constraints indicates electrical connections into N-wells or into a semiconductor wafer substrate.

14. The non-transient computer readable media of claim 10, wherein one of the set of layout constraints indicates array or track based routing, or matched or symmetrical routing.

15. The non-transient computer readable media of claim 10, wherein a set of types of the circuit structures in the identified group are identified, wherein the placement and routing depend on the identified set of types.

16. A system for layout of an analog circuit, the system comprising:
a memory system storing a description of the analog circuit; and
a computer containing a layout engine that is configured to:
identify a group of circuit structures represented in the description, wherein the circuit structures in the identified group are associated with a layout constraint in a constraint hierarchy associated with the description of the analog circuit, wherein the constraint hierarchy defines relationships between layout constraints;
identify a set of layout constraints that applies to one or more of the circuit structures in the identified group; and
place and route the identified group of circuit structures in a layout of the analog circuit, wherein the set of layout constraints are used to determine placement and routing for the identified group of circuit structures.

17. The system of claim 16, wherein:
identifying the group of circuit structures comprises selecting the layout constraint from a particular level in a constraint hierarchy and identifying the circuit structures in the description that are limited by the layout constraint; and
identifying the set of layout constraints comprises identifying one or more layout constraints that are in the constraint hierarchy between the particular level and a root level of the constraint hierarchy.

18. The system of claim 16, wherein one of the set of layout constraints specifies one of a horizontal aligned row, a vertical aligned column, and an aligned array of device instances.

19. The system of claim 16, wherein one of the set of layout constraints minimizes area when packing device instances or minimizes electrical routing lengths when placing devices in the layout.

20. The system of claim 16, wherein one of the set of layout constraints indicates a desired width or spacing on an electrical route or electrical routing layer.

* * * * *